Patented May 4, 1937

2,079,424

UNITED STATES PATENT OFFICE 2,079,424

METHOD OF RECOVERING ACID FROM ACID SLUDGES

Chester L. Read, Jersey City, and Paul J. Harrington, Westfield, N. J., assignors to Standard Oil Development Company, a corporation of Delaware No Drawing. Application December 27, 1933, Serial No. 704,089

4 Claims. (Cl. 23—173)

This invention relates to the treatment of acid sludges obtained by the action of sulfuric acid on petroleum oils or distillates for recovering sulfuric acid therefrom, and particularly relates to the treatment of viscous acid sludge, i. e., acid sludge obtained by the action of sulfuric acid on mineral oils.

In the treatment of crude oils, lubricating oil distillates and medicinal oils with sulfuric acid, sludges are formed, especially from the first increments of the acid applied, which are very viscous. These sludges are frequently so viscous as to make handling difficult or impossible. Separation of tar and weak acids from these sludges is also very troublesome and the low yield of acid and high acidity and viscosity of the tar make separation very unattractive. Efforts have been made in the past to flux heavy sludges before moving or separating them, but the use of the fluxing stocks formerly tried has the following disadvantages:

1. Cracked products, such as cracking coal tar, etc., when fluxed with heavy sludges result in the formation of carbonaceous solids which tend to clog burners used to burn the resulting separated oil.

2. Crude pitches are of relatively high viscosity at the low temperatures necessary when handling sludges, and usually contain enough cracked materials to cause the formation of carbonaceous solids on contacting with the sludges, with the result that it is difficult to burn the resulting separated oil by means of oil burners.

3. Light crude fractions are too valuable to degrade to "acid oil" and tar. Because of its acid content and the nuisance associated with its combustion, "acid oil" has a value far below that of fuel so that even crude pitch or cracking coal tar would suffer a degradation when fluxing with heavy sludges.

An object of this invention is to provide a method of treating heavy acid sludges so that handling and separation are facilitated without formation of coke and without greatly degrading the fluxing stock.

A further object of this invention is to provide a method of treating heavy acid sludges so that a greater amount of sulfuric acid may be recovered from the heavy acid sludges.

According to this invention, in the acid treating of refined oil distillates and naphtha distillates a relatively low viscosity sludge is formed. Likewise, a relatively low viscosity sludge is obtained in the treatment of a heavier mineral oil with sulfuric acid after the viscous sludge formed in the first one or two treats with sulfuric acid has been removed. This low viscosity sludge obtained in the treatment of refined oil distillates, naphtha distillates, and heavier mineral oil with sulfuric acid is readily separated on the addition of water and heating and an "acid oil" of low viscosity is obtained. This "acid oil" is of low viscosity so that a relatively small amount of it has a large effect in lowering sludge viscosity on fluxing, and it does not coke on contacting with a heavy acid sludge. A specific example is as follows:

The acid sludge derived from the treatment of crude distillate with 20% fuming sulfuric acid for the production of medicinal oils is very viscous and is most difficult to pump. The separation of this sludge with water is difficult and results in very low acid recovery and the formation of a high acid content fuel which must be heated and fluxed with a fuel oil before burning. One volume of this sludge is fluxed with one volume of a naphtha distillate acid separated oil (which had been previously separated by diluting with water a sludge form by treating a naphtha distillate with strong sulfuric acid) with the result that the fluxed stock obtained is very mobile and may be easily pumped and handled. This fluxed sludge may then be diluted with water and a 70 to 80% acid recovery obtained in the separated aqueous layer. The oil layer obtained may be easily handled and has a low acid content, permitting it to be burned without further fluxing.

Alternatively, in treating a heavy crude distillate with strong sulfuric acid in a number of treats, the sludge obtained in the first or first and second treats is viscous. The subsequent treats with strong sulfuric acid yield relatively low viscosity sludges. These relatively low viscosity sludges are separately diluted with water, heated, and on settling separate into layers of "acid oils" of low viscosity and dilute acids. The viscous sludge obtained in the first or first and second acid treats is then mixed with the separated "acid oils" thus obtained, diluted with water, heated, and on settling readily separates into layers of an "acid oil" and dilute sulfuric acid. This separated "acid oil" similarly may be easily handled and has a low acid content, permitting it to be burned without further fluxing.

Inasmuch as the above description and examples have been given merely for the sake of illustration and not for the purpose of limiting the invention thereto, it is intended to claim all inherent novelty in the invention as broadly as the prior art permits.

We claim:

1. The process of treating acid sludges obtained from the acid treatment of petroleum oils, which comprises adding to a relatively high viscosity sludge obtained by a sulfuric acid treatment of a petroleum oil, a low viscosity acid oil that has been separated by diluting with water a low viscosity acid sludge obtained by a sulfuric acid treatment of a petroleum oil, diluting the mixture of oil and sludge with water, treating, settling and separately withdrawing dilute sulfuric acid and oil.

2. The process of decomposing high viscosity acid sludges which comprises fluxing a sludge obtained by the treatment of petroleum oil with fuming sulfuric acid with an acid oil that has been separated, after dilution with water, from a low viscosity sludge obtained by treating a light petroleum distillate with sulfuric acid, diluting the mixture of sludge and acid oil thus obtained with water and separately removing dilute sulfuric acid and acid oil.

3. The process of treating acid sludges, which comprises diluting an acid sludge obtained from the sudfuric acid treatment of a heavy petroleum oil, with a low viscosity "acid oil" that had been separated by diluting with water a low viscosity sludge obtained by the sulfuric acid treatment of a petroleum oil, diluting the mixture of sludge and acid oil with water, heating, settling and separately withdrawing a dilute acid and an acid oil.

4. A process of treating acid sludges obtained from the acid treatment of heavy petroleum oils, which comprises adding an acid oil separated by dilution with water of a sludge obtained by the acid treatment of a light petroleum oil to an acid sludge obtained by the acid treatment of a heavy petroleum oil, diluting with water, settling and separately withdrawing the dilute acid and acid oil.

CHESTER L. READ.
PAUL J. HARRINGTON.